US007789101B2

(12) United States Patent
Talty

(10) Patent No.: US 7,789,101 B2
(45) **Date of Patent: *Sep. 7, 2010**

(54) OXYGEN SUPPLY SYSTEM HAVING A CENTRAL FLOW CONTROL

(75) Inventor: James Talty, Orchard Park, NY (US)

(73) Assignee: Carleton Technologies, Inc., Orchard Park, NY (US)

( * ) Notice: Subject to any disclaimer, the term of this patent is extended or adjusted under 35 U.S.C. 154(b) by 1590 days.

This patent is subject to a terminal disclaimer.

(21) Appl. No.: 10/836,698

(22) Filed: Apr. 30, 2004

(65) Prior Publication Data

US 2005/0005939 A1 Jan. 13, 2005

Related U.S. Application Data

(63) Continuation-in-part of application No. 10/428,640, filed on May 2, 2003, now Pat. No. 7,341,072.

(51) Int. Cl.
*F16K 17/36* (2006.01)
*F16K 15/00* (2006.01)
*F16K 17/00* (2006.01)

(52) U.S. Cl. .................................... 137/81.1; 137/467

(58) Field of Classification Search ............ 128/201.28, 128/204.26, 204.29, 202.22, 204.22; 137/81.1, 137/908; 244/118.5, 194

See application file for complete search history.

(56) References Cited

U.S. PATENT DOCUMENTS 2,308,124 A * 1/1943 Stettner .................... 137/81.1
3,103,927 A * 9/1963 Henneman et al. ..... 128/201.28
3,179,119 A * 4/1965 Fitt et al. .................. 137/81.1
3,203,770 A * 8/1965 Ranum ...................... 422/198
4,499,914 A * 2/1985 Schebler .................... 137/81.1
4,858,606 A * 8/1989 Hamlin ................. 128/204.29
4,919,124 A * 4/1990 Stevenson et al. ...... 128/202.26
4,928,682 A * 5/1990 Stevenson et al. ...... 128/202.26
5,255,661 A * 10/1993 Nankee et al. .............. 123/674
5,351,682 A * 10/1994 Foote .................... 128/205.24
5,709,204 A 1/1998 Lester
5,809,999 A 9/1998 Lang
6,041,714 A * 3/2000 Trent et al. ............... 105/199.4
6,244,540 B1 6/2001 Stabile et al.
2004/0216742 A1* 11/2004 Talty .................... 128/204.26

* cited by examiner

*Primary Examiner*—Steven O Douglas
*Assistant Examiner*—Kristen C Matter
(74) *Attorney, Agent, or Firm*—Jaeckle Fleischmann & Mugel, LLP

(57) ABSTRACT

A Regulator-Oxygen (ROX) Unit for regulating oxygen flow in an emergency oxygen distribution system in passenger aircraft initially allows unregulated surge of oxygen to purge ambient air from the system. After sufficient pressure is achieved in the system, the ROX unit regulates oxygen flow mechanically with a diaphragm engaging a regulator valve that responds to the pressure of the oxygen under the diaphragm to reduce the flow of oxygen through the ROX unit, which accounts for altitude changes by communicating the inlet pressure to the chamber above the diaphragm. A bleed exit allows the oxygen to escape to the ambient air. One or more aneroid valves serve to adjust the amount of oxygen allowed to exit through the bleed exit, allowing less oxygen to escape with increasing altitude. An increase in pressure above the diaphragm allows more oxygen to flow through the regulator valve.

29 Claims, 8 Drawing Sheets

OXYGEN SUPPLY SYSTEM HAVING A CENTRAL FLOW CONTROL

CROSS-REFERENCE TO RELATED APPLICATIONS

This application is a continuation-in-part of U.S. patent application Ser. No. 10/428,640, filed May 2, 2003 now U.S. Pat. No. 7,341,072.

STATEMENT REGARDING FEDERALLY SPONSERED RESEARCH OR DEVELOPMENT

Not applicable.

BACKGROUND OF THE INVENTION

This application relates to oxygen flow control systems for emergency oxygen supply systems in passenger aircraft.

Emergency oxygen supply systems for passenger aircraft are well known and characterized by being able to provide to each passenger a supply of oxygen in the case of an emergency. These systems are designed to be used during cabin de-pressurization and thus are intended to supply each passenger with a sufficient oxygen flow to meet the physiological requirements for high-altitude survival.

In the past the main emphasis in development has been directed towards improved breathing apparatus, improved oxygen generation, or accurate delivery of oxygen to meet physiological requirements.

U.S. Pat. No. 6,244,540 issued to Stabile teaches a method for calculating the oxygen required after emergency cabin decompression, but is a relatively complex system that provides constant monitoring of altitude.

U.S. Pat. No. 5,709,204 issued to Lester discloses a specially designed escape mask, but does not recognize the problem of cabin depressurization and the need to charge the system quickly with oxygen using a pneumatic control system.

U.S. Pat. No. 5,809,999 issued to Lang teaches an emergency oxygen supply system of an aircraft equipped with a pressurized cabin, breathable gas is supplied by a gas generator (1) for generating an oxygen-enriched gas either from the ambient air, or from air tapped from the engine whereby passengers receive mixed gas having an adequate oxygen content. This system is complex and requires power during operation.

Therefore, what is needed in the art is an emergency oxygen supply system that is simple and responds to changes in altitude without external monitoring.

Further what is needed in the art is an emergency oxygen supply system that recognizes cabin depressurization and quickly charges the system with oxygen.

Even further what is needed in the art is an emergency oxygen supply system that doesn't require power to regulate oxygen flow after activation.

BRIEF SUMMARY OF THE INVENTION

A centralized flow control unit is provided for a multiple passenger emergency oxygen system that is pneumatically controlled and provides oxygen to the passengers and crew as a function of altitude. In the event of an emergency de-pressurization of the passenger cabin, an emergency oxygen supply will be activated that provides each passenger with a source of oxygen. The amount of oxygen that a passenger requires in order to remain conscious depends upon and is inversely related to the altitude of the plane. At high altitudes the passenger will require more oxygen to compensate for the lower level of oxygen available in the cabin. In order to provide the oxygen quickly, the distribution lines running to the passengers must be purged of the ambient air (that contains only the normal amount of oxygen) and replaced with pure oxygen. After the system has been purged the lines are then supplied with the altitude dependent supply of oxygen.

The central flow control valve system (CFCV) is operated by pneumatic means after it is activated to simplify the system and reduce the amount of electrical power required to operate. After activation, the system locks mechanically in operating mode until the system is reset, thus insuring operation throughout the emergency without need to draw further electrical power. The CFCV provides a simple subsystem that automatically charges the distribution lines with oxygen, and then operates without further electrical power requirements to supply the human physiological oxygen requirement at effective altitude. This supply requirement is achieved in a two phase system; increased oxygen supply from 10,000 to 15,000 feet, and a more rapidly increasing oxygen/altitude supply rate increase at above about 15,000 feet.

BRIEF DESCRIPTION OF THE SEVERAL VIEWS OF THE DRAWINGS

The above-mentioned and other features and advantages of this invention, and the manner of attaining them, will become appreciated and be more readily understood by reference to the following detailed description of the embodiments of the invention in conjunction with the accompanying drawings, wherein.

Corresponding reference characters indicate corresponding parts throughout the several views. The exemplifications set out herein illustrate the preferred embodiments of the invention and such exemplifications are not to be construed as limiting the scope of the invention in any manner.

DETAILED DESCRIPTION OF THE INVENTION

Figure 1:
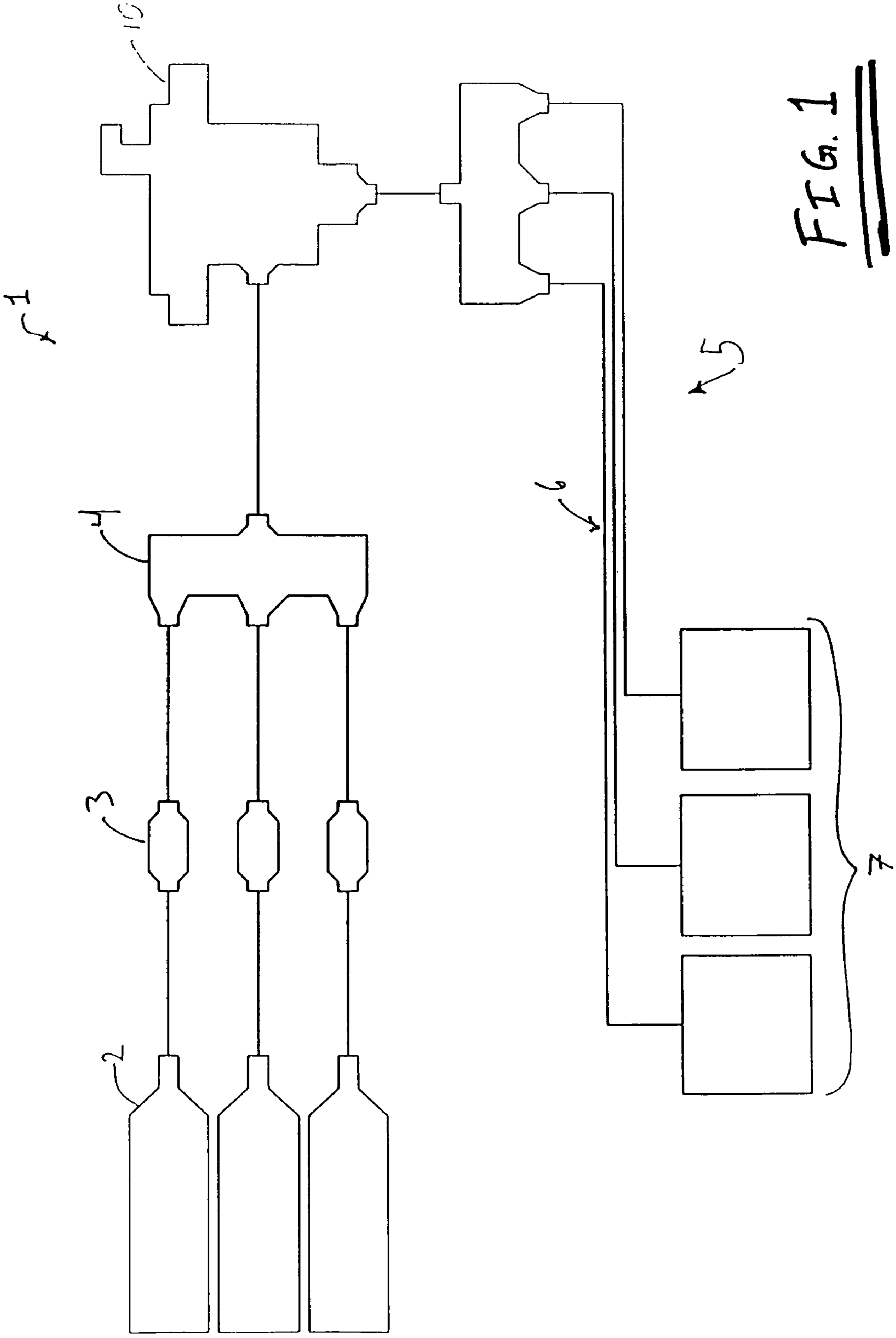
FIG. 1 is a schematic of one embodiment of the emergency oxygen supply system having a central control valve.

Referring now to FIG. 1, an emergency oxygen supply system (1) for a passenger aircraft has an oxygen supply, usually in the form of multiple bottles (2) of highly pressurized oxygen that are stepped down to through regulators (3) to pressures of 115-125 pounds per square inch. Oxygen is then fed through a manifold (4) to a central flow control valve (10) that controls the charging and supply of the distribution system (5) of oxygen to passengers. The distribution system has multiple lines (6) that provide emergency oxygen to multiple individual user stations (7). These user stations typically are drop down masks that are deployed in the case of emergency and can be used by each individual passenger.

The CFCV (10) is kept inactive until activated by either a person or an automatic sensor. Then the CFCV (10) operates to provide a full pressure purge of the distribution lines (6) in order to replace the ambient air with oxygen. Typically the purge is done by allowing relatively unrestricted flow of the oxygen through the CFCV (10) from the source manifold for a period of about 5 seconds (although the amount of time will depend upon the volume of the distribution system). This surge of pressure also serves to unlatch the mask container doors in the multiple individual user stations (7).

Figure 2:
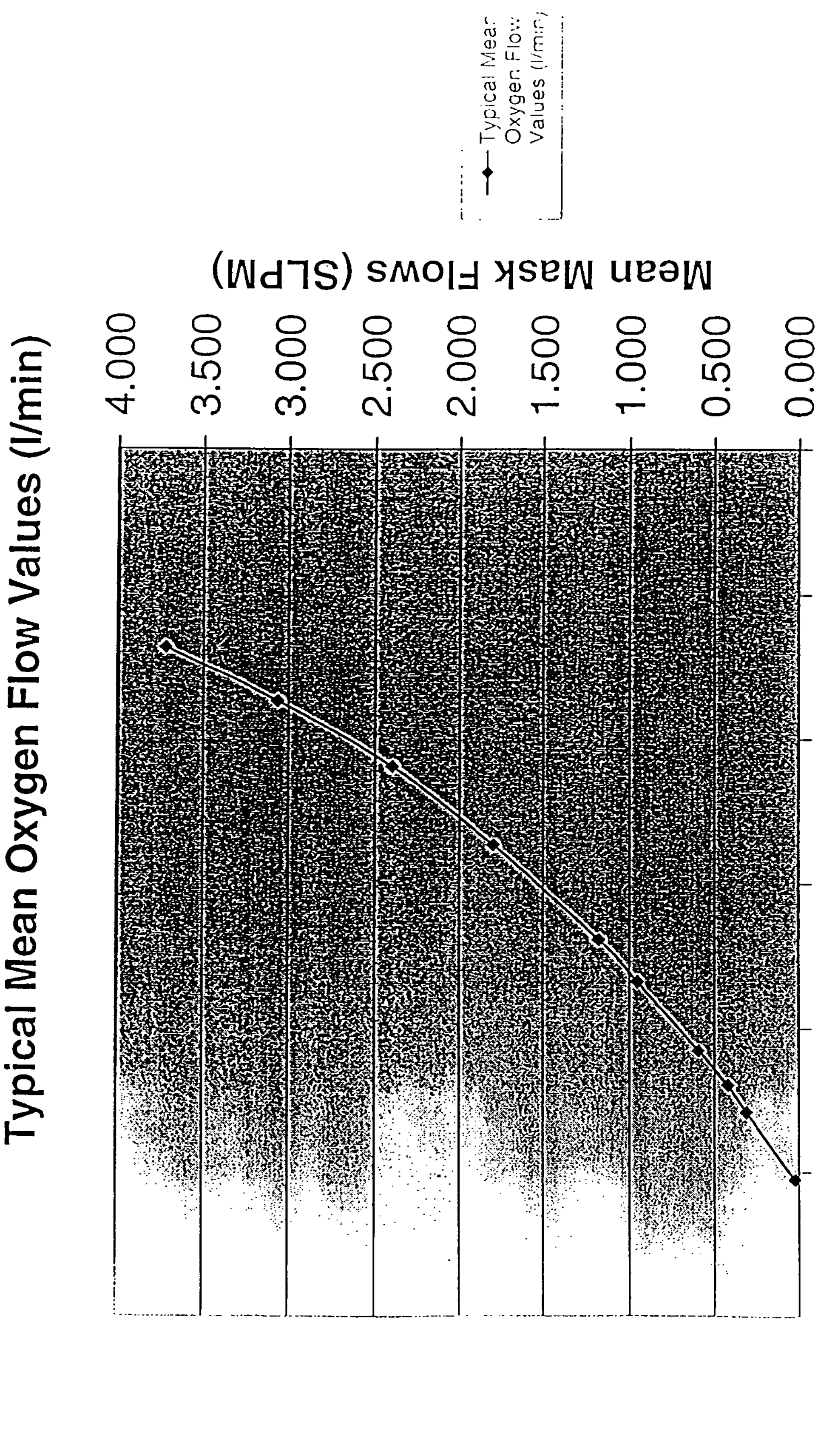
FIG. 2 is a schematic of the physiological oxygen requirement as a function of altitude.
Figure 4:
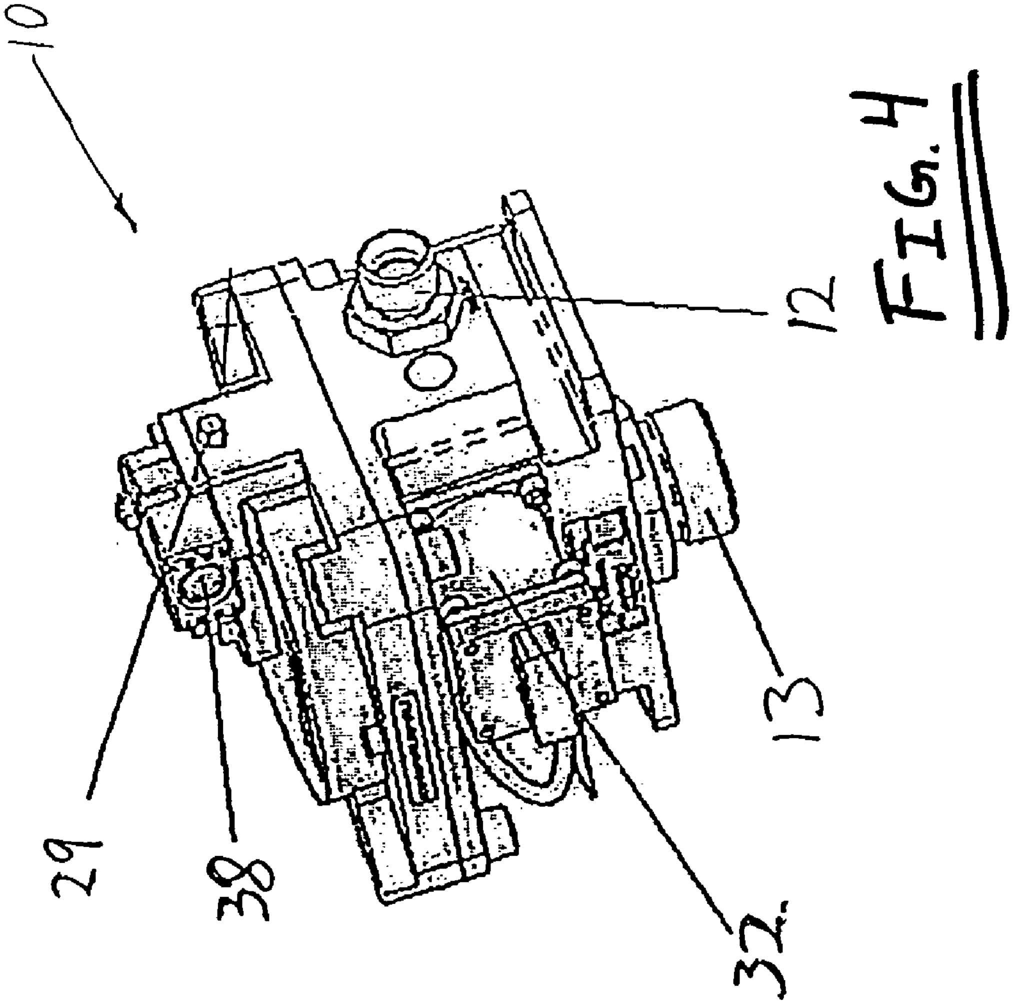
FIG. 4 is a perspective view of one embodiment of the central control valve specifically showing the inlet and outlet ports.
Figure 3:
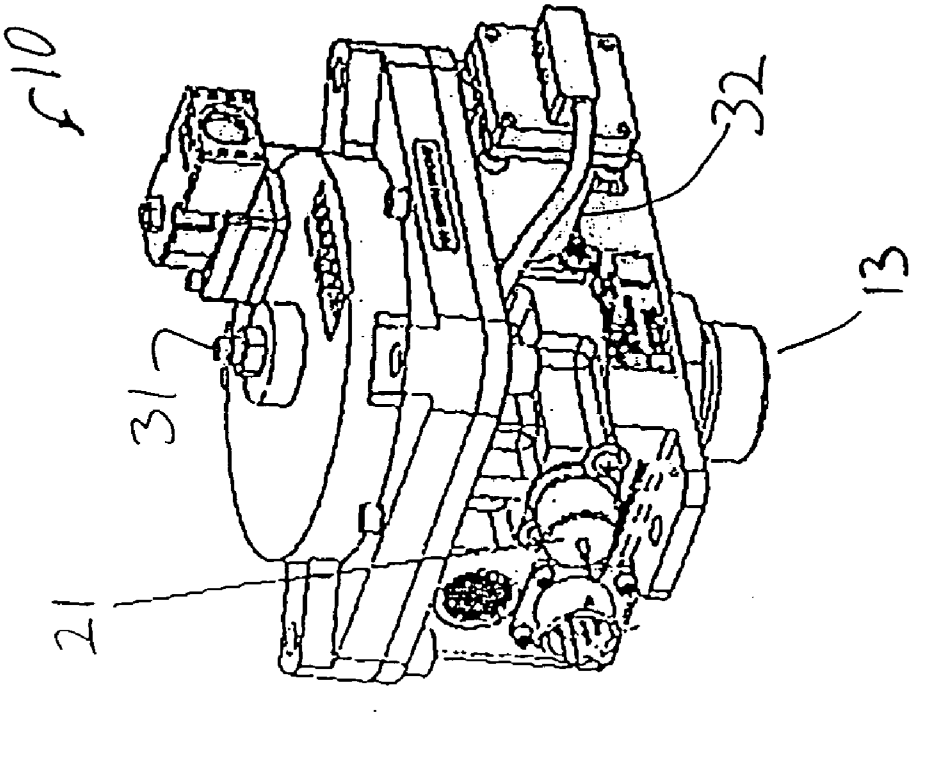
FIG. 3 is a perspective view of one embodiment of the central control valve showing the surge port control plug.
Figure 5:
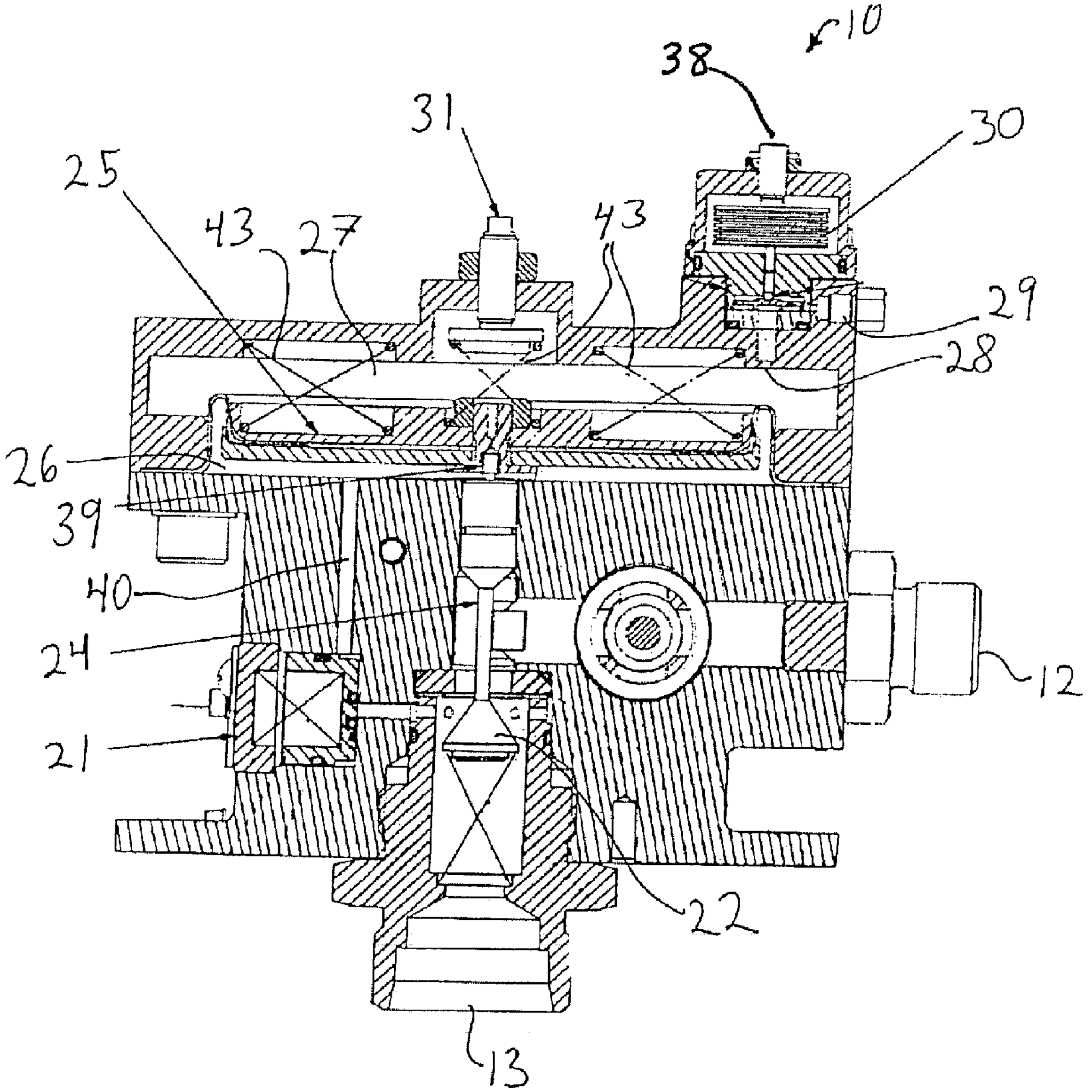
FIG. 5 is a cross sectional view of the inner workings including the surge control mechanism of the central control valve in one embodiment.

After purging the system the CFCV (10) then regulates the oxygen flow as a function of pressure within the passenger cabin. If de-pressurization has occurred due to a compromise of the pressure cabin integrity, the CFCV (10) will adjust the pressure of the oxygen supply to exceed the minimum physiological requirement for the altitude equivalent of the prevailing cabin pressure. In general, the physiological oxygen requirement follows the curve shown in FIG. 2 and is approximately linear above 15,000 ft (atmospheric pressure is about 8.3 psia at 15,000 ft). The CFCV (10) then increases flow to provide a greater supply of oxygen to the passenger mask as altitude increases. Referring now to FIG. 5, this flow rate is controlled pneumatically, rather than by electronic means, by use of a spring loaded diaphragm assembly (25) that regulates a pressure regulating valve (22) disposed in the outlet air passage (13), spring-loaded in an open position. This pressure regulating valve (22) is axially disposed relative to a valve seat so that it can be moved to control the flow rate out the outlet passage.

A small orifice (39) in the central axis of the diaphragm (25) communicates between a first pressure chamber (26) and said second pressure chamber (27) and as time passes the pressure between the chambers equalizes. At relatively low altitudes the altitude aneroid (30) opens the bleed valve (29) of the second chamber (27), and the diaphragm (25) reacts to lower the outlet pressure. At higher altitudes the altitude aneroid (30) expands and closes the bleed valve (29) and the diaphragm (25) maintains the regulating valve (22) in a relatively more open position allowing greater oxygen pressures and flows.

Of course, the system operates in such a fashion that the system is not completely open or closed in operation and meets or exceeds the physiologically required oxygen flow at the particular pressure of the cabin. This regulation is continuous and after activation operates pneumatically.

Figure 6:
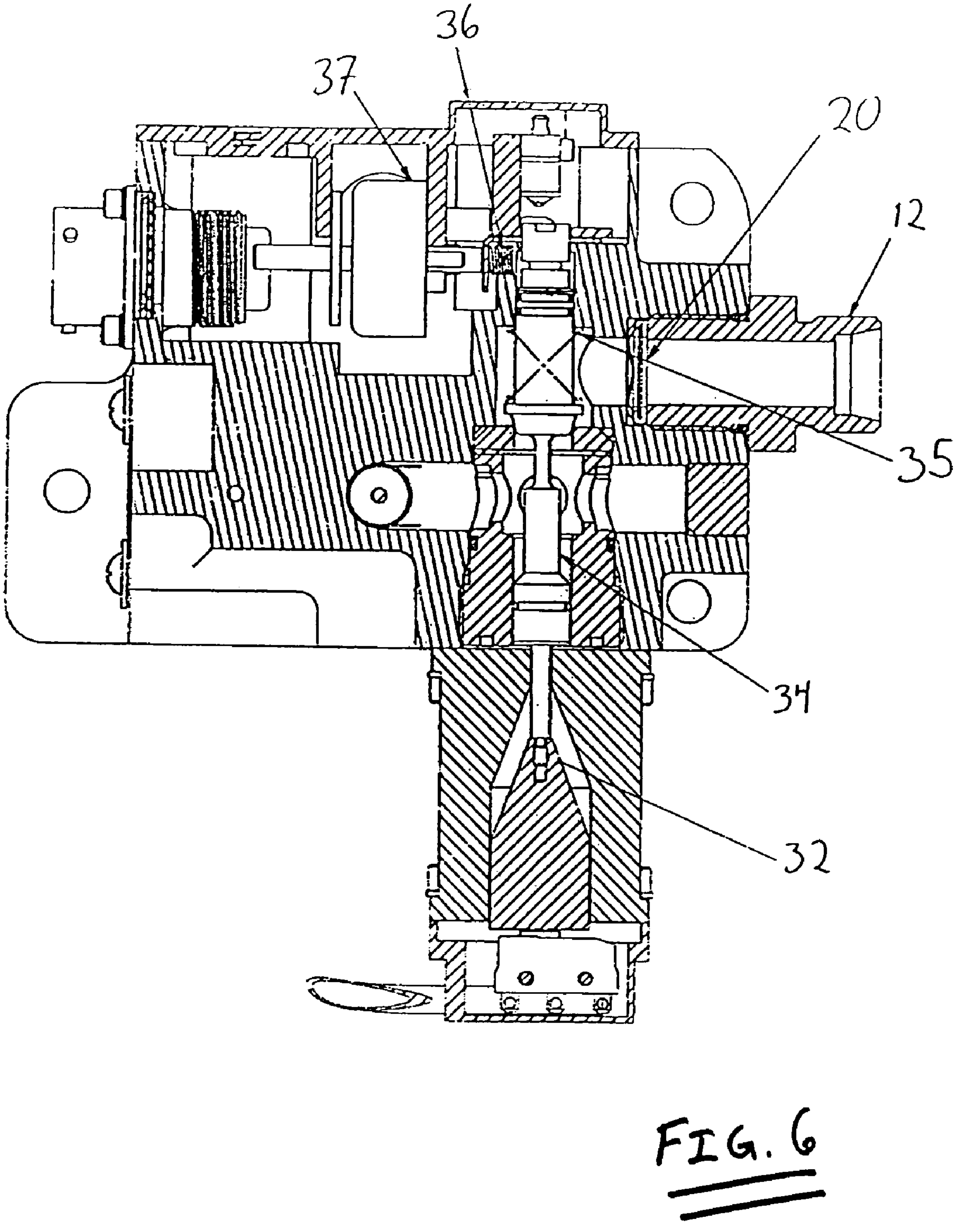
FIG. 6 is a cross sectional view of the central control valve 90 degrees from the vertical axis of FIG. 5 and specifically shows the operational lock mechanism.

Referring now to FIGS. 5 and 6, activation of the central flow control valve is accomplished electronically. An electronic activation signal causes the activation solenoid (32) to open the activation valve (34) against the spring (35) that normally holds it closed, opening the inlet passageway (12) and outlet passageway (13). In the preferred embodiment, the activation signal is a nominal 28 VDC for a maximum of 5 seconds. The oxygen source (2) then is free to flow through the inlet port (12) through to the outlet passageway (13), past the filter assembly (20), the oxygen pressure regulating valve (22), and the surge flow poppet valve (21) and exiting into the oxygen distribution system (5) via the outlet port (13). After flow activation a mechanical latch (36) engages the activation valve (34) and keeps the CFCV (10) in an open position and the solenoid (32) deactivates.

Resetting of the CFCV (10) is achieved when an electronic reset signal of 28 VDC in the preferred embodiment activates the reset solenoid (37). The activation of the reset solenoid disengages the mechanical latch (36) from the activation valve (34) to thereby allow the spring force to close the activation valve (34), thereby stopping the flow of oxygen between the manifold (4) and the oxygen distribution system (5). Further, the reduction in pressure within the CFCV (10) to ambient pressure allows a biasing spring to close the surge flow poppet valve (21). The reset solenoid (37) then deactivates and the CFCV (10) is ready to accept an activation signal.

The oxygen flow valve mechanism (22) has a valve stem and upper piston (24) that operates as disposed in a cylinder that communicates with the main pressure control diaphragm (25). The main pressure control diaphragm (25) is disposed in a chamber and sealably engages the chamber sidewall to create a first chamber (26) and second chamber (27). The first chamber is connected to small pressure sensing passage (40) via a pneumatically controlled surge mechanism (21) that when open allows the outlet passageway (13) pressure to be communicated to the first chamber (26). The second chamber (27) on the other side of the diaphragm (25) communicates with the high altitude bleed opening (28) that is controlled by a high altitude aneroid (30).

The surge time is controlled by the CFCV (10) by pneumatic means in that the size of the poppet (21) determines the time required to depress the poppet (21) and communicate exit port (13) pressure to the first pressure chamber (26) of the diaphragm mechanism. Thus, a surge flow control mechanism, of one embodiment, purges ambient air from the oxygen supply system for a predetermined surge time. After activation, the full manifold (4) supply pressure enters the inlet port (12), past the opened activation valve (22) and into the outlet port (13), where this high pressure depresses the poppet valve (21) until it opens to the pressure sensing passage (40).

When opened after surge, the pressure sensing passageway (40) allows pressure buildup in the first chamber (26) that raises the spring loaded diaphragm (25) and the pressure regulating valve (22), which decreases flow and pressure. As pressure builds in the first chamber (26), gas is allowed to flow through the small orifice (39) that communicates to the second chamber (27). Additionally, flow is adjusted by operation of the altitude aneroid (30).

The design of the pressure control diaphragm (25) uses multiple springs (43) to provide greater accuracy, and also employs an additional fine adjustment screw (31). The multiple springs (43) are arranged radially around the central axis of the diaphragm (25) to provide stability, and also allows spring strength to be more accurately and precisely controlled than in the case of a larger single spring. In the preferred embodiment, the CFCV diaphragm (25) uses seven springs; six distributed radially, and one located along the central axis.

Referring to FIG. 5, the CFCV further includes a test port (38) for simulating the air pressure at different altitudes while the aircraft is on the ground. The test port (38) is in fluid communication with the altitude aneroid (30). To calibrate the CFCV (10), a vacuum source is connected to the test port (38), the activation solenoid (32) is activated, and the surge flow poppet valve (21) is opened such that the CFCV (10) is regulating the oxygen flow. The vacuum applied to the test port (38) is varied to simulate different altitudes while the outlet pressure is monitored. If the outlet pressure of the CFCV (10) is lower than what is physiologically required, the fine adjustment screw (31) is lowered such that the central axis spring exerts a greater force on the diaphragm assembly (25). This allows more oxygen through the oxygen pressure regulating valve (22) thereby increasing the outlet pressure for any given ambient air pressure. In the case that the outlet pressure of the CFCV (10) is significantly higher than what is physiologically required such that the oxygen supply (2) will be depleted too quickly, the fine adjustment screw (31) is raised such that the central axis spring exerts a smaller force on the diaphragm assembly (25). This allows less oxygen through the oxygen pressure regulating valve (22) thereby decreasing the outlet pressure for any given ambient air pressure.

Figure 7:
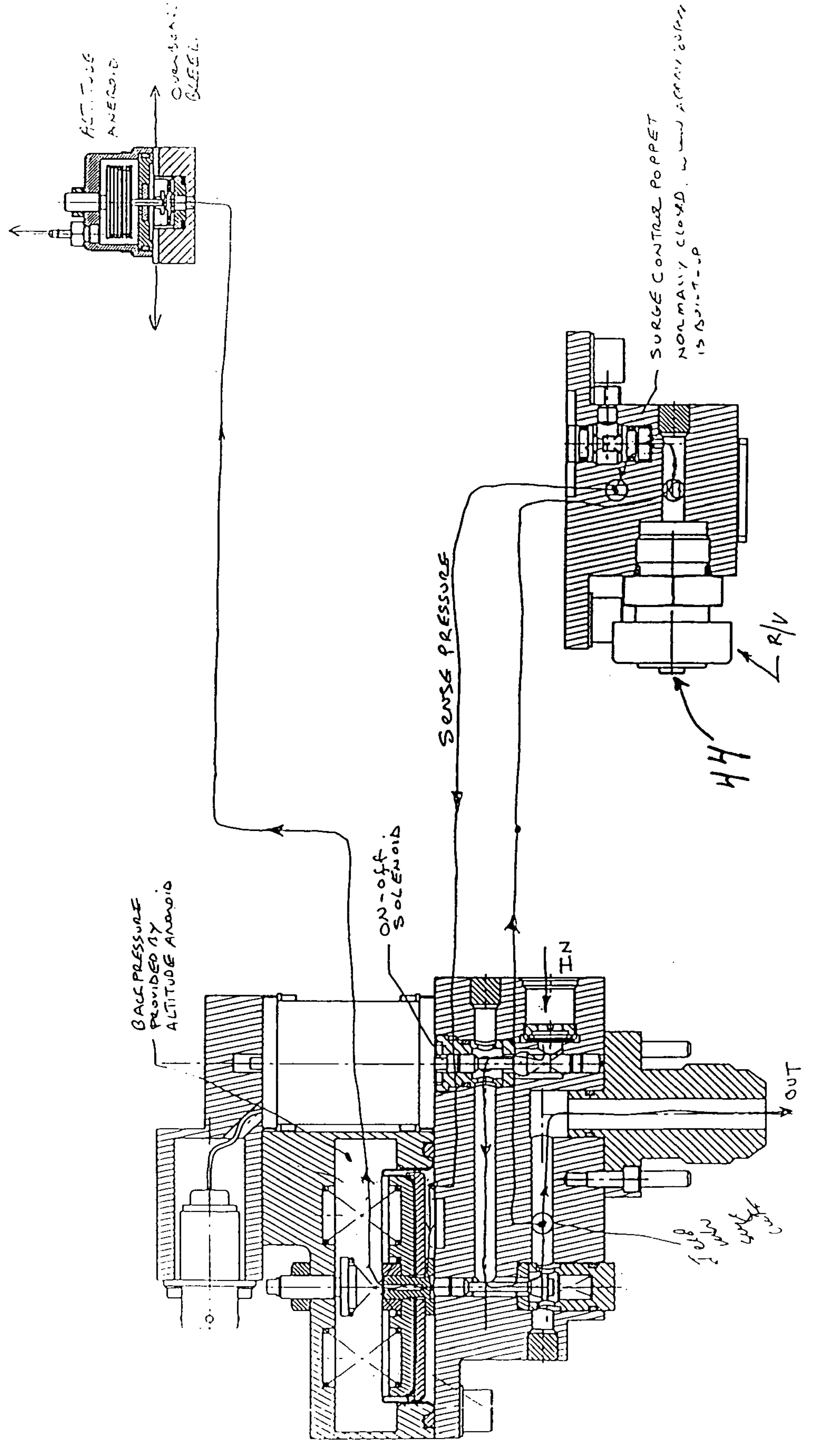
FIG. 7 is a schematic flow chart of the operation of the central control valve showing the surge mechanism in operation and the regulation of oxygen supply as a function of altitude.

FIG. 7 shows the flow of oxygen through a CFCV (10) having a slightly different configuration. As shown in FIG. 7, the CFCV (10) may also include a relief valve (44) in fluid communication with the pressure sensing passage (40). The relief valve (44) is configured to relieve the fluid pressure in the pressure sensing passage (40) in the case that the fluid pressure reaches a pressure that may damage components downstream of the outlet air passage (13).

Figure 8:
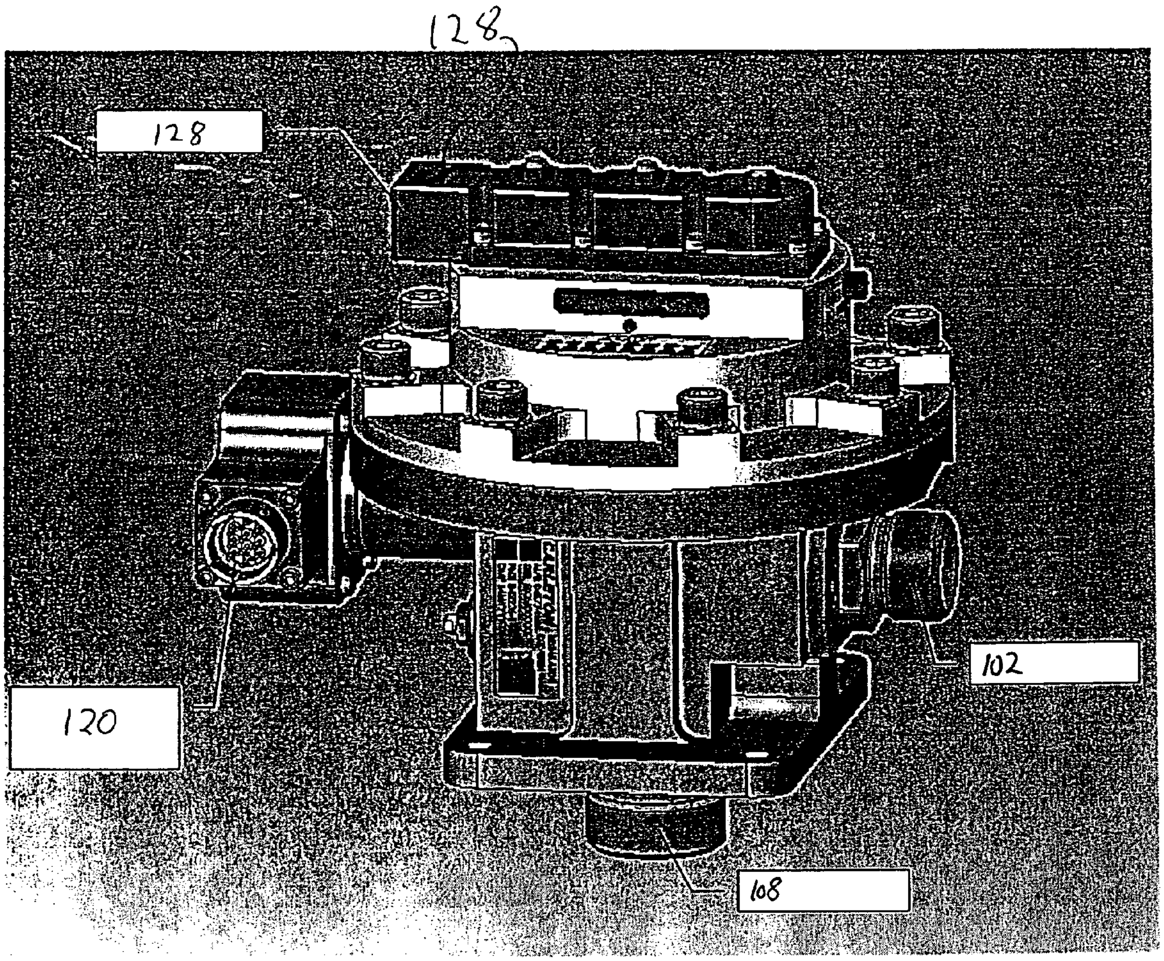
FIG. 8 is an isometric view of a second embodiment of the invention.
Figure 9:
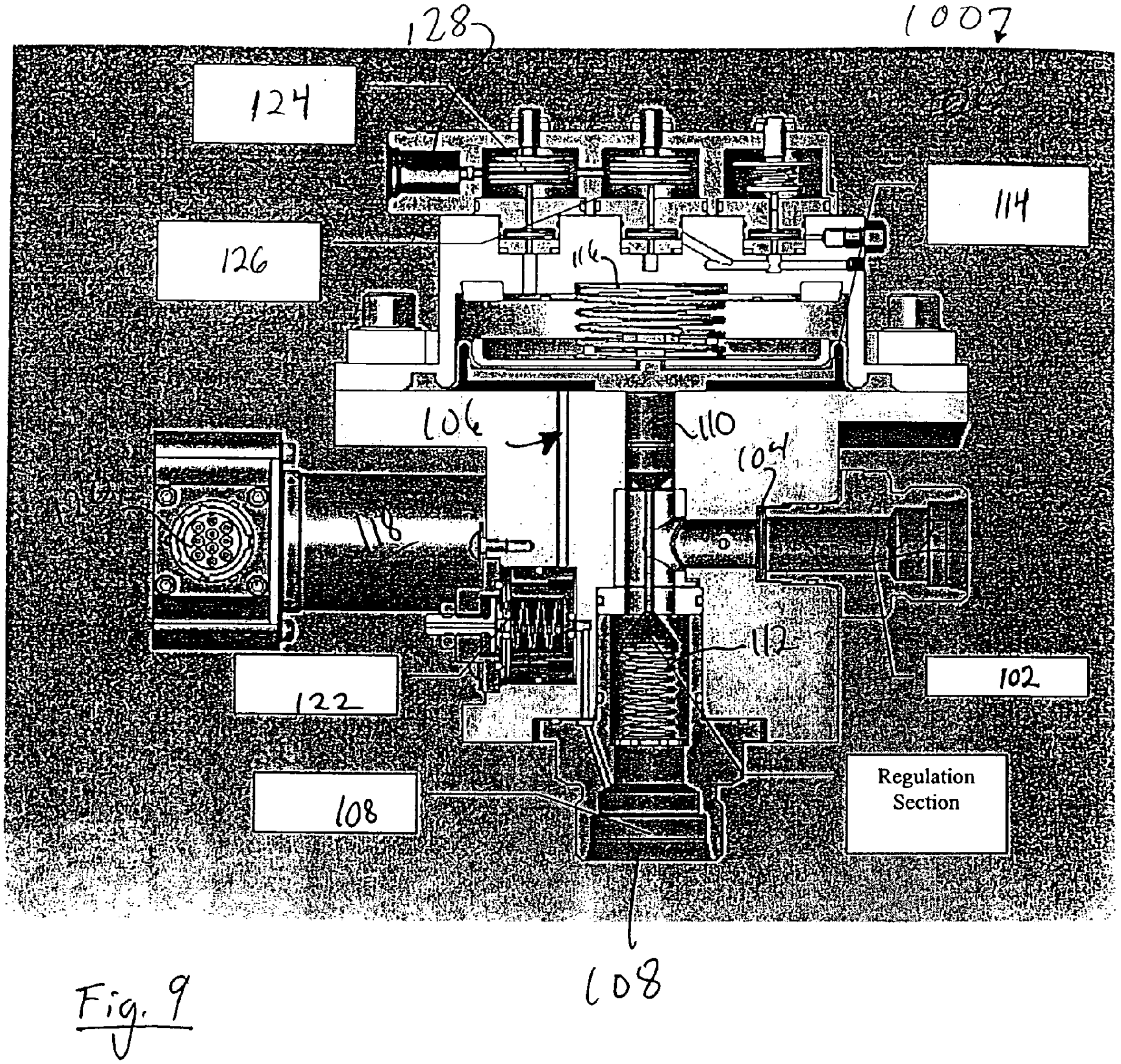
FIG. 9 is a cross-sectional view of the second embodiment of FIG. 8.

In another embodiment, a Regulator-Oxygen (ROX) Unit is shown in FIGS. 8 and 9. In general, the ROX unit 100 regulates the charging and supply of the distribution system 5 with a single poppet valve and multiple aneroids. The ROX unit 100 includes and inlet 102, a filter assembly 104, a poppet assembly 106, and an outlet 108.

The poppet assembly 106 includes a poppet valve 110, a poppet spring 112, a diaphragm 114, and a diaphragm spring 116. A latching pilot valve 118 normally maintains the poppet assembly 106 in the closed position by preventing fluid communication between the inlet 102 and the upper diaphragm chamber 121 thereby allowing the poppet spring 112 to maintain the poppet valve 110 in the closed position. The latching pilot valve 118 includes a solenoid that is actuated electronically by a person or an aircraft computer under emergency conditions through an electronic interface 120. When open, the latching pilot valve 118 allows fluid communication between the inlet 102 and the upper diaphragm chamber 121.

Similarly to the first embodiment, a surge valve 122 is normally closed, however a predetermined outlet pressure will open the surge valve 122 allowing fluid communication between the outlet 108 and the lower diaphragm chamber 123, which is below the diaphragm 114.

The pressure in the chamber above the diaphragm 114 is allowed to bleed off as described in the first embodiment. Alternatively, a high altitude aneroid 124 and a low altitude aneroid 126 may be used in concert to control the amount of gas that is allowed to bleed off. The multi-slope outlet pressure profile achieved by using two aneroids regulates the outlet pressure to more closely match the required flow vs. altitude curve shown schematically in FIG. 2. The result is that fewer oxygen cylinders are required for a given descent profile for the aircraft.

In use, the poppet spring 112 biases the poppet valve 110 in the closed position. The latching poppet valve 118 is opened by an electric signal to the electronic interface 120 to the solenoid. The latching poppet valve 118 latches open and remains open when power is removed. The inlet pressure is now communicated to the upper diaphragm chamber 121. The increased pressure pushes down on the diaphragm, which opens the poppet valve 110 and allows the fluid pressure to charge the distribution lines 6 (FIG. 1). Since the surge valve 122 is closed, the outlet pressure builds until a predetermined pressure that opens the surge valve 122 is reached. The outlet pressure is now in fluid communication with the lower diaphragm chamber 123 and thus the outlet pressure is regulated by the poppet assembly 106. The aneroids 124 and 126 increase the gas flow through the ROX unit 100 for lower ambient pressures, which correspond to higher altitudes by limiting the amount of gas allowed to bleed off from the upper diaphragm chamber 121. Thus pressure in the upper diaphragm chamber 121 increases forcing the diaphragm 114 down and opening the poppet valve 110 to increase the output pressure. Conversely, higher ambient pressures corresponding to lower altitudes cause the aneroids 124 and 126 to allow more gas to bleed off from the upper diaphragm chamber 121. The diaphragm 114 moves up allowing the poppet spring 112 to force the poppet valve 110 towards the closed position to decrease the output pressure.

A reset signal to the electronic interface 120 activates the solenoid to latch the latching poppet valve 118 in the closed position. The inlet pressure is no longer communicated to the upper diaphragm chamber 121 and the pressure in the upper diaphragm chamber 121 decreases as the gas bleeds out. The lower pressure in the upper diaphragm chamber 121 allows the poppet spring 112 to force the poppet 110 into the closed position to thereby stop the gas flow through the ROX unit 100.

It should be noted that, similar to the first embodiment, the ROX unit 100 includes a test port 128. Further, the diaphragm 114 may be biased by multiple diaphragm springs 116 and the diaphragm spring 116 may be adjustable as described in the first embodiment.

The invention claimed is:

1. A centralized flow control unit for oxygen flow regulation in a system that supplies emergency oxygen to passengers and cabin attendants in commercial airlines, comprising:

an oxygen inlet;

an actuation poppet assembly comprising an actuation valve having an actuation inlet and an actuation outlet, the actuation inlet of said actuation valve being in fluid communication with said oxygen inlet and including an actuation valve seat, the actuation valve further having an inlet side and a solenoid side, the inlet side of the actuation valve engaging an actuation spring configured to bias the inlet side against the actuation valve seat;

an actuation solenoid engaging the actuation valve, said actuation solenoid being configured to force said actuation valve against said actuation spring and thereby open said actuation valve upon receipt of an actuation signal;

a reset solenoid engaging the actuation valve, said reset solenoid being configured to release said actuation valve upon receipt of a reset electric signal, thereby allowing said actuation spring to bias said actuation valve against said actuation valve seat and thereby close said actuation valve;

a regulator poppet assembly comprising a regulator valve having a regulator inlet and a regulator outlet, said regulator inlet being in fluid communication with said actuator outlet of said actuation valve;

an oxygen outlet in fluid communication with said regulator outlet, said oxygen outlet having an oxygen outlet pressure; and means for biasing said regulator valve toward the open state with a force that is a function of the oxygen outlet pressure and the ambient air pressure.

2. The centralized flow control unit according to claim 1 further comprising an actuation valve latch configured to engage the actuation valve, thereby maintaining the actuation valve in the open position after said actuation solenoid forces the actuation valve to the open position, and further to engage the actuation valve upon receipt of the reset electric signal, thereby allowing the actuation spring to bias the actuation valve against the actuation valve seat and thereby close said actuation valve.

3. The centralized flow control unit according to claim 1, further comprising an electrical switch in selective electrical communication with said actuation solenoid or said reset solenoid, said electrical switch being selectively operable to apply the actuation signal to said actuation solenoid or the reset electric signal to said reset solenoid.

4. The centralized flow control unit according to claim 1, wherein said regulator poppet assembly includes a regulator valve seat, and the regulator valve further has a diaphragm side and an outlet side, the outlet side of the regulator valve engaging a regulator spring configured to bias the outlet side in the direction of the regulator valve seat.

5. The centralized flow control unit according to claim 4, wherein said means for biasing said regulator valve comprises a diaphragm having a regulator side and a spring loaded side, the regulator side of said diaphragm engaging the regulator valve, the spring loaded side of said diaphragm including a plurality of diaphragm springs, said diaphragm being configured to bias said regulator valve in the open position.

6. The centralized flow control unit according to claim 5, wherein said means for biasing said regulator valve further comprises a feedback passage in fluid communication with said oxygen outlet and the regulator side of said diaphragm, said feedback passage including a spring loaded surge piston configured to prevent fluid communication between said feedback passage and the regulator side of said diaphragm until a predetermined pressure is reached in said oxygen outlet, after which the spring loaded surge piston permits fluid communication between said oxygen outlet and the regulator side of said diaphragm for substantially any pressure, thereby decreasing the force of said diaphragm opposing the biasing force of said diaphragm springs on said regulator valve with an increase in oxygen outlet pressure.

7. The centralized flow control unit according to claim 6, wherein said means for biasing said regulator valve further comprises a relief valve in fluid communication with said feedback passage, said relief valve being configured to permit fluid communication between said feedback passage and ambient air to prevent the air pressure in said feedback passage and the oxygen outlet pressure from exceeding a predetermined maximum pressure, thereby protecting any components downstream of said oxygen outlet.

8. The centralized flow control unit according to claim 5, wherein said means for biasing said regulator valve further comprises a bleed passage that provides fluid communication between the regulator side and the spring loaded side of said diaphragm.

9. The centralized flow control unit according to claim 8, wherein said means for biasing said regulator valve further comprises a bleed exit in fluid communication with the spring loaded side of said diaphragm.

10. The centralized flow control unit according to claim 9, wherein said means for biasing said regulator valve further comprises an aneroid valve in fluid communication with said bleed exit, said aneroid valve being configured to linearly decrease bleed flow to said bleed exit with decreasing ambient pressure to thereby cause an increase in pressure on the spring loaded side of said diaphragm, resulting in an increase in the force of said diaphragm on said regulator poppet assembly with a decrease in ambient pressure.

11. The centralized flow control unit according to claim 10, wherein said aneroid valve is a high altitude aneroid valve.

12. The centralized flow control unit according to claim 10, wherein said aneroid valve is a low altitude aneroid valve.

13. The centralized flow control unit according to claim 10, wherein said aneroid valve includes a high altitude aneroid valve and a low altitude aneroid valve.

14. The centralized flow control unit according to claim 10, wherein said means for biasing said regulator valve further comprises a test port in fluid communication with said aneroid valve, said test port configured for attachment to a vacuum source to thereby allow simulation of high altitude conditions for the purpose of calibrating said means for biasing said regulator poppet assembly.

15. The centralized flow control unit according to claim 5, wherein the plurality of diaphragm springs includes at least one spring engaging a calibration screw that is configured for adjusting the spring force on said diaphragm.

16. The centralized flow control unit according to claim 1, wherein said oxygen outlet is configured for connection to an oxygen distribution system.

17. A regulator-oxygen unit for oxygen flow regulation in a system that supplies emergency oxygen to passengers and cabin attendants in commercial airlines, comprising:

an oxygen inlet;

an actuation poppet comprising a flow control valve situated in a fluid passage that is in fluid communication with said oxygen inlet;

a solenoid operable to open and close said flow control valve;

a first latch configured to engage the flow control valve, thereby maintaining said flow control valve in the open position after the solenoid forces said flow control valve to the open position and power is removed from said solenoid;

a second latch configured to engage the flow control valve, thereby maintaining said flow control valve in the closed position after the solenoid forces said flow control valve to the closed position and power is removed from said solenoid;

a regulator poppet assembly having a regulator inlet and a regulator outlet, the regulator inlet of said regulator poppet assembly being in fluid communication with said oxygen inlet;

an oxygen outlet in fluid communication with the regulator outlet of said regulator poppet assembly, said oxygen outlet having an oxygen outlet pressure; and means for biasing said regulator poppet assembly toward the open state with a force that is a function of the oxygen outlet pressure and the ambient air pressure.

18. The regulator-oxygen unit according to claim 17, wherein said regulator poppet assembly includes a regulator valve seat and a regulator valve having a diaphragm side and an outlet side, said outlet side of the said regulator valve engaging a regulator spring configured to bias said outlet side in the direction of said regulator valve seat.

19. The regulator-oxygen unit according to claim 18, wherein said means for biasing said regulator poppet assembly comprises a diaphragm having a regulator side and a spring loaded side, said regulator side of said diaphragm engaging said regulator valve, said spring loaded side of said diaphragm including at least one diaphragm spring.

20. The regulator-oxygen unit according to claim 19, wherein said means for biasing said regulator poppet assembly further comprises a feedback passage in fluid communication with said oxygen outlet and the regulator side of said diaphragm, said feedback passage including a spring loaded surge piston configured to prevent fluid communication between said feedback passage and the regulator side of said diaphragm until a predetermined pressure is reached in said oxygen outlet, after which said spring loaded surge piston permits fluid communication between said oxygen outlet and the regulator side of said diaphragm.

21. The regulator-oxygen unit according to claim 19, wherein said means for biasing said regulator poppet assembly further comprises a bleed outlet in fluid communication with the spring loaded side of said diaphragm.

22. The regulator-oxygen unit according to claim 21, wherein said means for biasing said regulator poppet further includes an aneroid valve.

23. The regulator-oxygen unit according to claim 22, wherein said aneroid valve is a high altitude aneroid valve.

24. The regulator-oxygen unit according to claim 22, wherein said aneroid valve is a low altitude aneroid valve.

25. The regulator-oxygen unit according to claim 22, wherein said aneroid valve is in fluid communication with said bleed outlet, said aneroid valve being configured to decrease bleed flow through said bleed outlet with decreasing ambient pressure, thereby causing an increase in pressure on the spring loaded side of said diaphragm.

26. The regulator-oxygen unit according to claim 25, wherein said means for biasing said regulator poppet assembly further comprises a test port in fluid communication with said aneroid valve, said test port being configured for attachment to a vacuum source, thereby allowing simulation of high altitude conditions for the purpose of calibrating said means for biasing said regulator poppet assembly.

27. The regulator-oxygen unit according to claim 19, further comprising a calibration screw that is configured for adjusting spring force on said diaphragm.

28. The regulator-oxygen unit according to claim 17, wherein said means for biasing said regulator poppet includes a high altitude aneroid valve and a low altitude aneroid valve.

29. The regulator-oxygen unit according to claim 17, wherein said oxygen outlet is configured for connection to an oxygen distribution system.

* * * * *